United States Patent [19]
Godard et al.

[11] 3,893,046
[45] July 1, 1975

[54] PARALLEL PLATE TRANSMISSION LINE LASER EXCITATION SYSTEM

[75] Inventors: Bruno Godard, Gif-sur-Yvette; Bernard Lacour, Villebon-sur-Yvette; Maurice Michon, Draveil, all of France

[73] Assignee: Compagnie Generale d'Electricite, Paris, France

[22] Filed: June 25, 1974

[21] Appl. No.: 482,914

[30] Foreign Application Priority Data
June 26, 1973 France .............................. 73.23375
Sept. 21, 1973 France .............................. 73.33973

[52] U.S. Cl....... 331/94.5 G; 331/94.5 PE; 330/4.3; 333/71; 333/84 M; 317/256
[51] Int. Cl........................... H01s 3/09; H01s 3/22
[58] Field of Search ....... 331/94.5; 330/4.3; 333/71, 333/84 M; 317/256

[56] References Cited
UNITED STATES PATENTS
3,821,664   6/1974   Godard et al..................... 331/94.5

*Primary Examiner*—Robert J. Webster
*Attorney, Agent, or Firm*—Sughrue, Rothwell, Mion, Zinn & Macpeak

[57] ABSTRACT

A gas laser generator comprising an electric excitation line formed by an insulating plate inserted between a first metallic plate and a second metallic plate, one edge of each of the plates being in the shape of a parabola, an active gaseous medium enclosed in a slot separating the first plate into two parts, a circuit for setting up an electrical discharge between the plates at the foci of the parabolas, each of the two parts of the first plate containing a sheet formed by an insulating layer inserted between two conductive layers, the sheet being folded back on itself so that its cross-section through a plane parallel to the slot and perpendicular to the plane of the plates is constituted by a continuous series of U's connected together by the top end of their vertical legs.

14 Claims, 6 Drawing Figures

PARALLEL PLATE TRANSMISSION LINE LASER EXCITATION SYSTEM

BACKGROUND OF THE INVENTION

1. Field of the Invention

The present invention relates to the field of gas laser generators in which a stimulated emission is obtained subsequent to an electrical discharge in an active gaseous medium.

2. Description of the Prior Art

Gas lasers, comprising a longitudinal cavity containing an active gas and in which an electrical discharge is obtained by means of a progressive current wave propagating in the active medium from one end to the other of the cavity with a speed equal to that of the propagation of a stimulated light emission in that cavity, are known.

Such gas lasers comprise a flat electric line, consisting of an insulating plate inserted between a first metallic plate and a second metallic plate brought to different potentials, and excitation means for generating a discharge wave in that line.

The gaseous active medium is arranged in a longitudinal slot formed in one of the metallic plates of the excitation line and in the path of the discharge wave.

It is known that a laser radiation obtained by this method has optimum power when the progressive discharge wave is perfectly plane.

To great advantage, the edges of the metallic plates are in the shape of a parabola whose axis forms an angle $\alpha$ greater than zero with the axis of the slot.

Moreover, the progressive current wave is generated by means of a discharger circuit suitable for producing a substantially point discharge between the metallic plates at the focus of the parabolas.

Nevertheless, such lasers cannot produce a maximum emissive power due, on the one hand, to their low overall capacity, in particular, and, on the other hand, to a discontinuity of impedance between the metallic plates.

SUMMARY OF THE INVENTION

The present invention makes it possible to overcome such major disadvantages, and it has for its object the provision of a high-capacity gas laser generator which can produce high light power with minimum losses, such a laser generator having, moreover, great simplicity of structure combined with a low cost.

The invention therefore concerns a laser generator comprising: an active gaseous medium; an electric excitation line formed by an insulating plate inserted between a first metallic plate and a second metallic plate, one edge of each of the plates being in the shape of a parabola whose axis forms an angle $\alpha$ greater than zero with at least one slot provided in the first metallic plate and separating it into two distinct parts; the foci as well as the apices of the parabolas being respectively arranged on the same straight line perpendicular to the plane of the plates, the metallic plates being parallel to each other and connected to at least one voltage source; means for maintaining an active gaseous medium in the slot and comprising a longitudinal insulating blade closing the slot and fixed onto the two parts of the first metallic plate; and means for generating a current wave in the line and comprising a circuit for producing a substantially point discharge between the metallic plates at the foci of the parabolas; characterized in that at least one of the parts of the first metallic plate is formed by a sheet consisting of an insulating layer inserted between two electrically conductive layers, the sheet being folded back on itself so that its cross-section through a plane parallel to the slot and perpendicular to the plane of the plates is in the form of a continuous series of U's connected together by the upper end of their vertical legs.

Other characteristics and advantages of the invention will become apparent from the following description, given by way of an example and which is purely illustrative and has no limiting character, with reference to the accompanying drawings.

DESCRIPTION OF THE PREFERRED EMBODIMENTS

Figure 1:
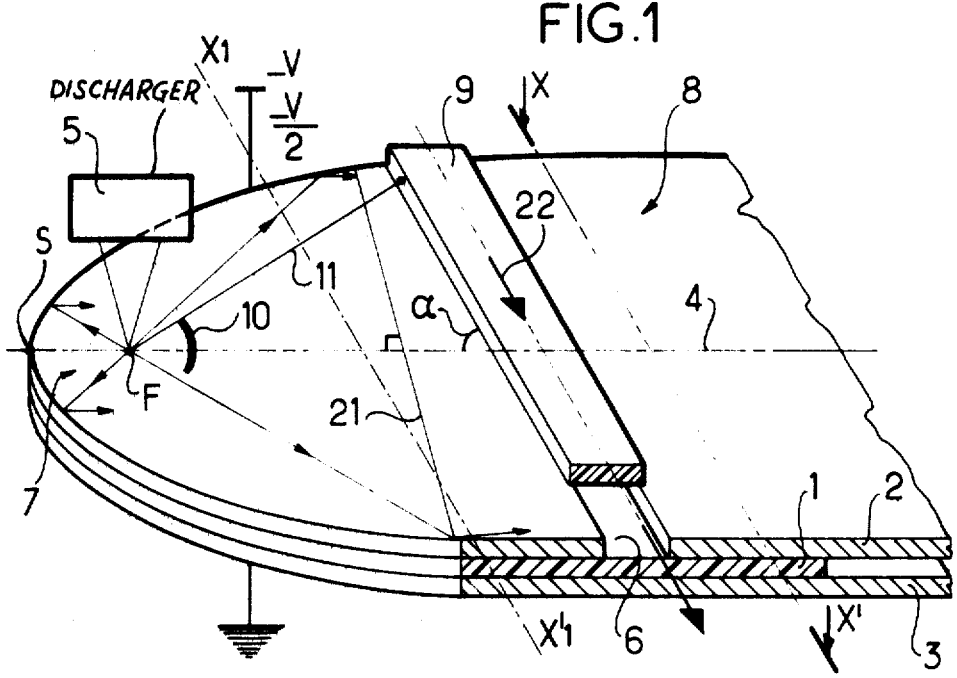
FIG. 1 is a general perspective view of a laser generator according to the invention.

With reference to FIG. 1, a laser generator comprises an electric excitation line consisting of an insulating plate 1 arranged between a first metallic plate 2 and a second metallic plate 3 brought to different potentials.

These plates are cut out at one of their ends in the shape of parabolas having an axis such as 4, foci F and apices S arranged respectively on straight lines perpendicular to the plane of the plates.

The laser comprises excitation means for generating a substantially point electrical discharge at the level of the foci F of the parabolas. These excitation means are constituted, for example, by a discharger diagrammatically shown at 5, or any other suitable means.

The rising time of the discharge wave front is, to great advantage, less than twice the propagation time for a discharge wave in the flat line between the focus F and the apex S of the parabola (that time being, for example, on the order of a nanosecond).

The plate 2 comprises a slot or recess 6 separating it into two distinct parts 7 and 8 in which an active laser medium is maintained.

In the case of air at atmospheric pressure, it is not necessary to close the gas recess. Otherwise, the gaseous medium may be enclosed by means of an insulating blade 9 arranged facing the slot 6 and fixed, by cementing, for example, to the two edges of that window. The ends of the gas recess are closed by two windows in a known manner.

The angle $\alpha$ is chosen so that $\cos\alpha$ is equal to the ratio between the speed of propagation of a discharge wave in the line in the direction defined by the axis 4 and the speed of propagation of a light emission in the direction of the slot 6.

A reflector 10 constituted, for example, by a drilling in the plate 2 in the shape of the arc of a circle centered on the point F is arranged on the side of apex S opposite to the focus F. Its transversal dimensions are limited substantially by two straight lines joining the point F to the end points of the slot 6; for example, one straight line 11 is shown.

Figure 2:
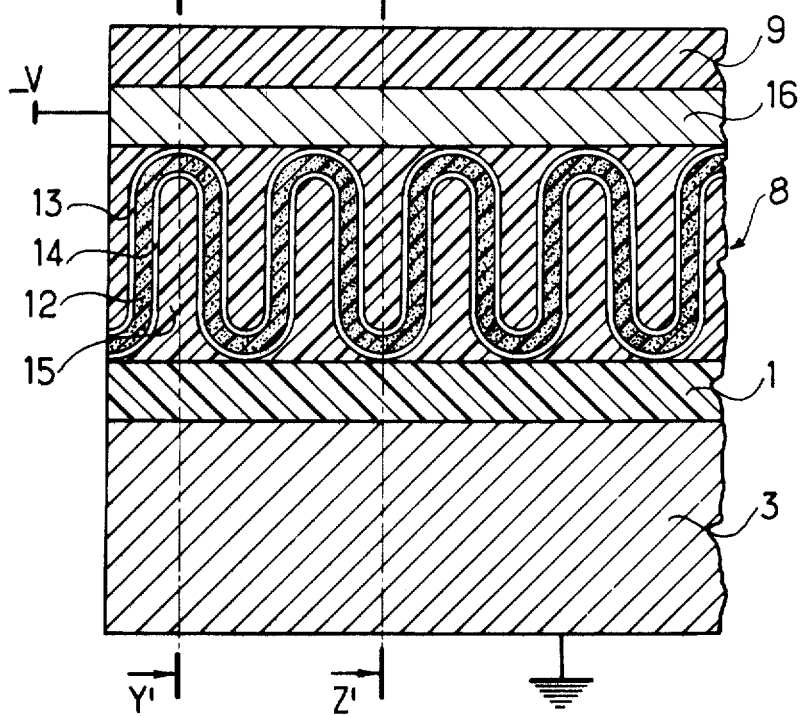
FIG. 2 is a sectional view through the axis XX' in FIG. 1, according to a first embodiment and optionally a sectional view through the axis XX' or the axis XIXI' in FIG. 1 according to a second embodiment.

FIG. 2 makes it possible to explain clearly the structure of the part 8 of the plate 1 according to a first embodiment. As shown in FIG. 2, part 8 consists of a sheet comprising an insulating layer 12 arranged between two conductive layers of copper 13 and 14 folded over in a U configuration as shown. A sealing substance, such as silastene, preferably fills the gaps 15 thus defined by such a structure. The sheet is put in electrical contact, on the one hand, at its upper part with a plate 16, and, on the other hand, at its lower part with the insulating plate 1 and the plate 3, in the way shown in FIGS. 3 and 4.

Moreover, the plate 16 and the layer 13 are brought to a potential $-V$, while the copper layer 14 is brought to a zero potential by means of the plate 3, and the part 7 of the plate 2 is brought to a potential of $-V$ or $-V/2$.

Figure 3:
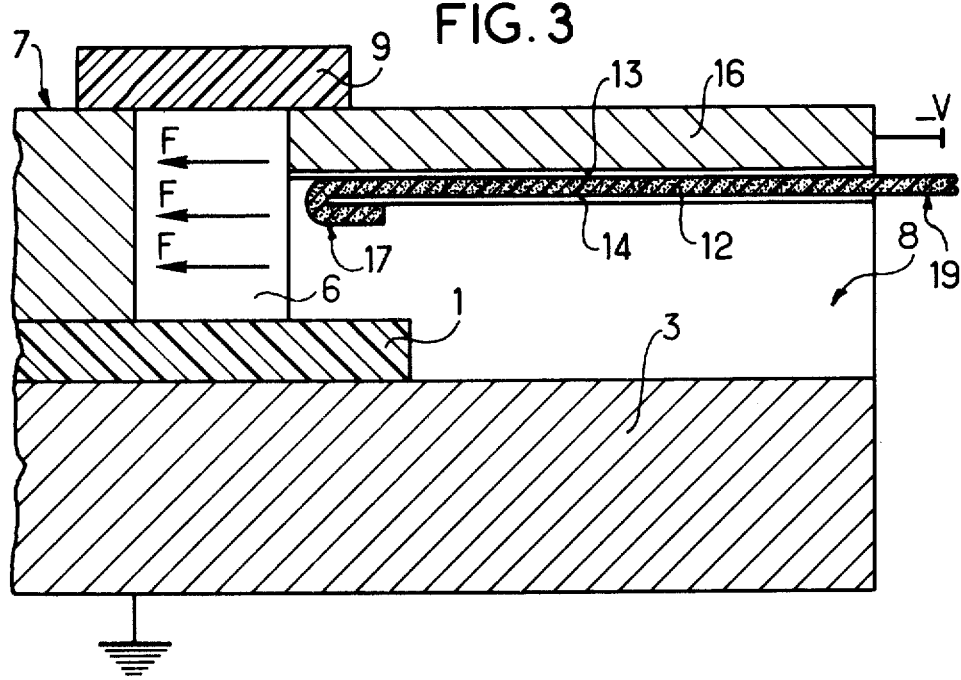
FIG. 3 is a sectional view through the axis YY' in FIG. 2 according to the first embodiment.
Figure 4:
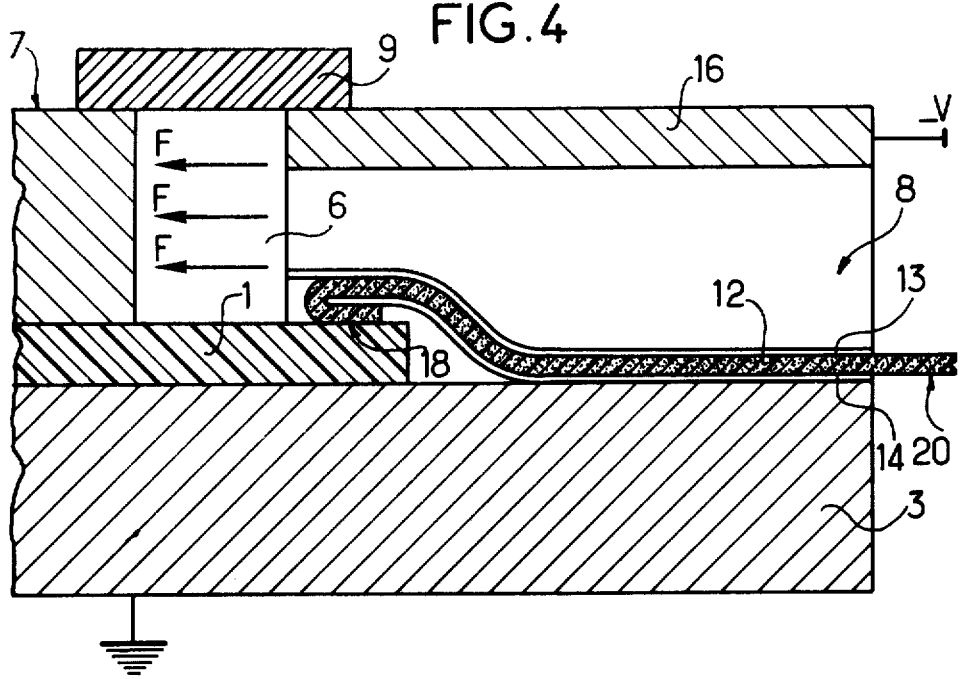
FIG. 4 is a sectional view through the axis ZZ' in FIG. 2 according to the first embodiment.

FIGS. 3 and 4 show that the copper layer 14 has a length less than that of layer 13 so that only the latter reaches the slot 6, the layer of insulating substance 12 being folded back on the end of the layer of copper 14 as shown at 17 and 18 in FIGS. 3 and 4, respectively.

Likewise, at the ends of the plates which are not cut out in the shape of parabolas, the insulating layer 12 extends slightly outwards in relation to the copper layers 13 and 14, as shown at 19 and 20, in FIGS. 3 and 4, respectively.

Such an arrangement of the insulating layer 12 makes it possible in all cases to avoid any undesirable arc-over between the conductive layers 13 and 14.

Such a device operates as follows: At a given instant the discharger 5 sends out a discharge at the foci F of the parabolas; the discharge wave thus generated has a radial symmetry in relation to the foci F, the portion of the discharge wave surface within the angle defined by the straight line 11 and its counterpart being reflected by the reflector 10.

All the waves emitted of the foci F are therefore directed towards the parabolas and are reflected from the peripheries of the parabolas. It is known that a parabola is perfectly stigmatic for two conjugate points; its focus and infinity. The wave surface coming from F and reflected by the parabola is therefore a perfectly plane wave surface perpendicular to the axis 4 of the parabolas, as shown by its trace 21.

The progressive discharge wave 21 therefore reaches successively in the direction of the arrow 22 the atoms or the molecules of the active gas. The stimulated light emission is therefore effected from one end of the slot to the other in the direction of the arrow 22 at the same speed as the progressive wave 21 in the direction of that slot. This condition makes it possible to obtain a very powerful coherent laser radiation at the output of the slot 6.

It should be observed, moreover, that at the time of the discharge generated by the discharger 5, the potentials of the part 7 of the plate 2 and of the plate 3 become substantially $-V/2$ or $-V/4$ according to whether the part of the plate 2 is brought to a potential $-V$ or $-V/2$. Consequently, a discharge occurs between the ends of the conductive layers 13 brought to the potential $-V$ and part 7 of the plate 2, this discharge being represented by the arrows F in FIGS. 3 and 4.

According to a second embodiment, part 7 of the metallic plate 1 has a structure substantially identical to that of the part 8, that structure being shown in FIG. 2.

Consequently, parts 7 and 8 each consist of a sheet comprising an insulating layer 12 arranged between two conductive copper layers 13 and 14 folded over in a U configuration as shown, a sealing substance, such as silastene lining, preferably filling the gaps 15 thus defined by such a structure. The sheet is put into electrical contact on the one hand, at its upper part with a plate 16, and, on the other hand, at its lower part with the insulating plate 1 and the plate 3, as shown in FIGS. 5 and 6.

Moreover, plate 16 and copper layer 13 of the part 8 are brought to a potential $-V$, whereas the layer 14 is brought to a zero potential by means of the plate 3, and the plate 16 and copper layer 13 of part 7 are brought substantially to a potential of $-V$ or $-V/2$.

Figure 5:
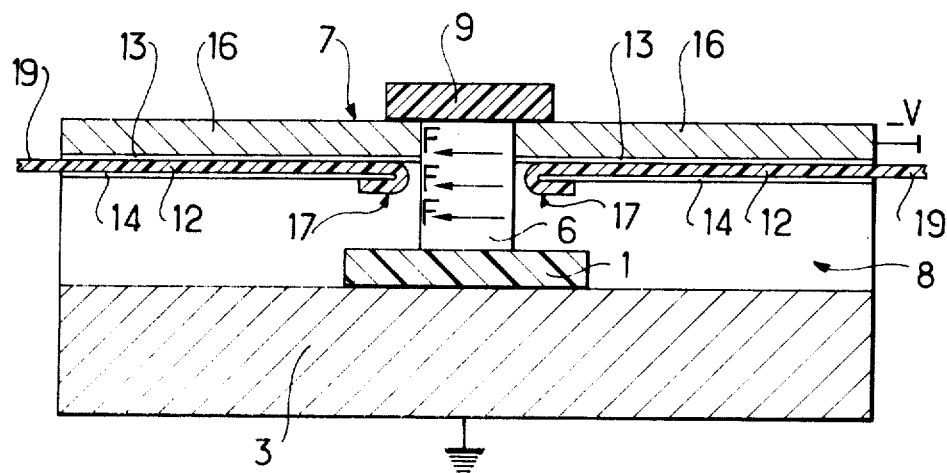
FIG. 5 is a sectional view through the axis YY' in FIG. 2 according to the second embodiment.
Figure 6:
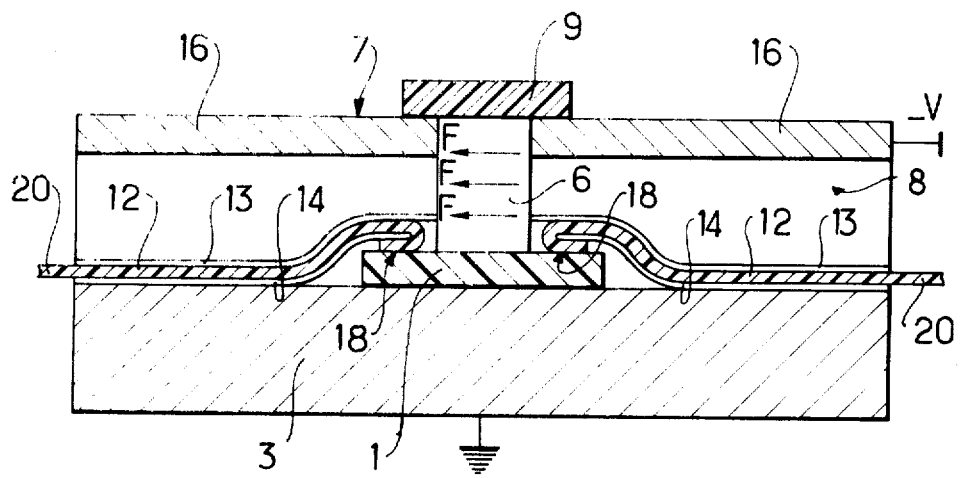
FIG. 6 is a sectional view through the axis ZZ' in FIG. 2 according to the second embodiment.

FIGS. 5 and 6 show that the copper layer 14 has, in the two parts, a length smaller than that of the layer 13 so that only the latter may reach the slot 6, the insulating layer 12 being folded over onto the end of the copper layer 14 as shown at 17 and 18 in FIGS. 5 and 6, respectively.

Likewise, at the ends of parts 7 and 8, the insulating layer 12 extends slightly towards the outside in relation to the copper layers 13 and 14, as shown at 19 and 20 in FIGS. 5 and 6, respectively.

Such an arrangement of the insulating layer 12 makes it possible, in all cases, to avoid any undesirable arc-over between the conductive layers 13 and 14.

The operation of such an embodiment is similar to that described previously.

It will be observed simply that at the time of the discharge generated by the discharger 5, the potentials of part 7 of the plate 2 and of the plate 3 become substantially $-V/2$ or $-V/4$ according to whether part 7 of the plate 2 is brought to a potential $-V$ or $-V/2$. Consequently, a discharge occurs between the ends of the conductive layers 13 of the part 8 brought to the potential $-V$ and the ends of the layers 13 of the part 7, that discharge being represented by the arrows F in FIGS. 5 and 6.

The desirable end result obtained with either embodiment is a particularly homogenous excitation of the gaseous emissive medium. It will be observed, moreover, that the copper layers 13 and 14 cooperate with the insulating layer 12 to provide a great capacity, thereby making it possible to obtain a high power with minimum losses, while avoiding discontinuities of impedance between the plates.

Such laser generators may therefore generate emissions having a very high rated power.

It must be understood that the invention is in no way limited to the embodiments described and llustrated, which have been given only by way of examples. More particularly, without going beyond the scope of the invention, it is possible to modify details, change certain arrangements or replace certain means by equivalent means.

We claim:

1. In a laser generator including: an active gaseous medium; an electric excitation line formed by an insulating plate inserted between a first metallic plate and a second metallic plate, one edge of each of the plates being in the shape of a parabola whose axis forms an angle $\alpha$ greater than zero with at least one slot formed in said first metallic plate and separating it into two distinct parts, the foci as well as the apices of said parabolas being respectively arranged on the same straight line perpendicular to the plane of the plates, said metallic plates being parallel to each other and connected to at least one voltage source; means for maintaining an active gaseous medium in said slot; and an excitation means for generating a current wave in said line and comprising discharger circuit means for producing a substantially point discharge between said metallic plates at the foci of the parabolas;

and comprising the improvement wherein at least one of the parts of said first metallic plate is formed by a horizontal metallic conductive plate, and a sheet consisting of an insulating layer inserted between two electrically conductive layers, said sheet being folded back on itself so that its cross-section through a plane parallel to the slot and perpendicular to the plane of the plates has substantially the form of a continuous series of U's having upper and lower ends and vertical legs, said upper ends being in contact with said horizontal metallic conductive plate, said lower ends being in contact with said insulating plate.

2. The improvements according to claim 1 wherein the distinct part (8) of said first metallic plate (2) is arranged on the opposite side of said slot (6) from said discharger circuit means (5).

3. The improvement according to claim 2 wherein the distinct part (7) of said first metallic plate (2) is on the same side of said slot (6) as said discharger circuit means (5) and comprises a sheet identical in form to the sheet comprising the other distinct part (8).

4. A laser generator according to claim 1 wherein at one of the ends of said sheet the conductive layer (13) has a length greater than that of the other conductive layer (14) and extends to said slot (6), and the end (17) of the insulating layer (12) is folded back onto the end of the other conductive layer (14).

5. The improvement according to claim 4 wherein at the other end of the sheet the end (19 or 20) of the insulating layer (12) extends beyond the ends of the electrically conductive layers (13 and 14).

6. The improvement according to claim 1 wherein the electrically conductive layer (13) bears, through the parts connecting together the vertical legs of the U's, against a conductive plate (16), whereas the other electrically conductive layer (14) bears, through the bases of the U's, at least partly against said second metallic plate (3) of the excitation line.

7. The improvement according to claim 1 wherein a sealing substance (15) fills the gaps in the folds of said sheet.

8. The improvement according to claim 1 wherein the recess defined by said slot (6) and an insulating blade (9) is closed at its ends by two insulating windows transparent to an emission radiation of said gaseous medium.

9. The improvement according to claim 1 wherein said angle $\alpha$ is such that cosine $\alpha$ is equal to the ratio between the propagation speed of said current wave along the axis (4) of said parabolas and the propagation speed of the emission radiation of said gaseous medium in the direction (22) of said slot (6).

10. The improvement according to claim 1 wherein said first metallic plate (2) further comprises a wave reflector (10) consisting of a drilling defined by an arc of a circle substantially centered on said focus (F), the apices (S) of said parabolas and said arc of said circle being arranged on opposite sides of said focus (F).

11. The improvement according to claim 4 wherein said distinct part (7) of said first metallic plate (2) is arranged on the same side of said slot as said discharger circuit means (5), and further comprising means for bringing both said part (7) and said electrically conductive layer (13) to the same potential (−V), and means for bringing said second metallic plate (3) and the other electrically conductive layer (14) to a substantially zero potential.

12. The improvement according to claim 4 wherein the distinct part (7) of said first metallic plate (2) is arranged on the same side of said slot (6) as said discharger circuit means, and further comprising means for bringing said part (7) to a potential (−V/2) substantially equal to half of the potential (−V) of the electrically conductive layer (13), and means for bringing both said second metallic plate (3) and the other electrically conductive layer (14) to a substantially zero potential.

13. The improvement according to claim 3 wherein said conductive layer (13) is longer than said conductive layer (14) and extends to said slot (6), and further comprising means for bringing the two parts (7 and 8) of said first metallic plate (2) and both electrically conductive layers (13) to the same potential (−V), and means for bringing said second metallic plate (3) and both of the electrically conductive layers (14) to a substantially zero potential.

14. The improvement according to claim 3 wherein the corresponding electrically conductive layer (13) of each of said parts (7) and (8) is longer than the corresponding layer (14) and extends to said slot (6), and further comprising means for bringing said part (8) and its corresponding conductive layer (13) to a potential whose value is substantially twice the value of the potential of the other part (7) of the first metallic plate (2) and its corresponding electrically conductive layer (13), and means for bringing the second metallic plate (3) and both of the other electrically conductive layers (14) to a substantially zero potential.

* * * * *